United States Patent [19]

Bos

[11] 3,917,858
[45] Nov. 4, 1975

[54] AGGLOMERATION OF INSTANT POWDERS

[75] Inventor: Jaap Willem Bos, Joure, Netherlands

[73] Assignee: D.E.J. International Research Company N.V., Keulsekade, Netherlands

[22] Filed: Dec. 13, 1972

[21] Appl. No.: 314,751

[52] U.S. Cl. ............... 426/594; 426/595; 426/285; 426/629; 426/640; 426/388; 426/453
[51] Int. Cl.² ...................... A23F 1/06; B01J 2/12
[58] Field of Search ........... 426/453, 388, 386, 387, 426/285, 147, 193, 96, 98, 519

[56] References Cited
UNITED STATES PATENTS

| | | | |
|---|---|---|---|
| 3,077,405 | 2/1963 | Clinton et al. | 426/388 |
| 3,148,070 | 9/1964 | Mishkin et al. | 426/386 |
| 3,244,533 | 4/1966 | Clinton et al. | 426/385 |
| 3,424,589 | 1/1969 | Kan et al. | 426/453 |
| 3,485,637 | 12/1969 | Adler et al. | 426/456 |
| 3,554,760 | 1/1971 | Sienkiewicz et al. | 426/453 |
| 3,713,842 | 1/1973 | Lubsen et al. | 426/388 |

*Primary Examiner*—Frank W. Lutter
*Assistant Examiner*—N. Greenblum
*Attorney, Agent, or Firm*—Baldwin, Egan, Walling & Fetzer

[57] ABSTRACT

A process for the preparation of aromatized and/or flavour enriched, water-soluble agglomerated powders of edible materials by fusing together primary particles of said edible material to form porous agglomerates, and simultaneously and homogeneously dispersing through the powder a water-immiscible, non-volatile, edible and organoleptically acceptable oil in which the desired aroma and flavour components have been dissolved.

6 Claims, 1 Drawing Figure

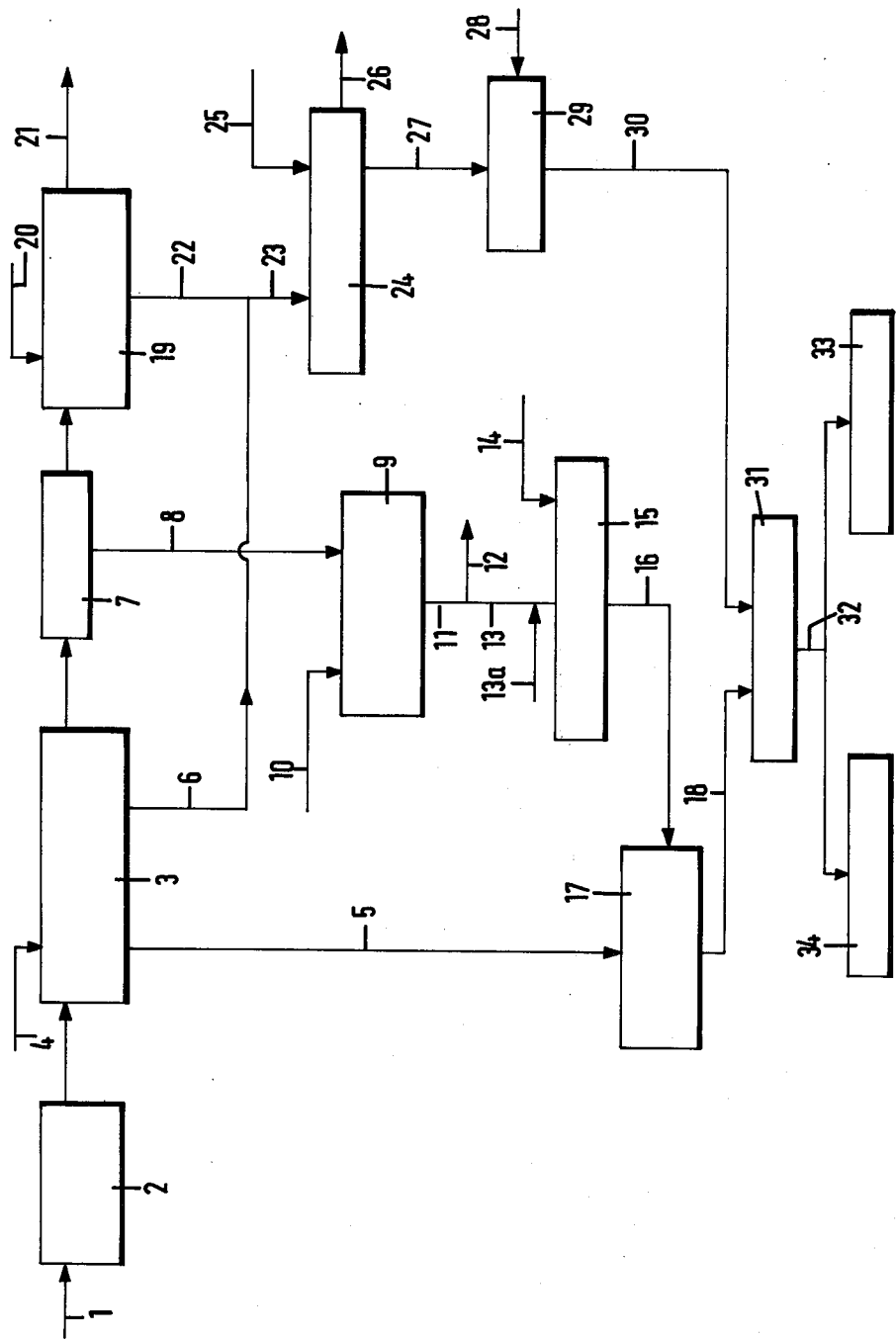

AGGLOMERATION OF INSTANT POWDERS

Instant powders are widely used: examples are instant coffee powder, instant tea, instant cocoa, instant chicory, instant milk, instant whiteners for coffee etc.

Flavour and aroma components are often an important ingredient of these instant powders.

The ingredients, whether derived from natural products or synthetic, are sometimes added after the drying step of the manufacturing process. It has been proposed in the manufacture of instant coffee to spray the aroma and flavour components as a fine mist onto the powder, together with water if necessary, after they have been incorporated in an oily substance; e.g. Canadian Pat. No. 837,021. Generally no substantial agglomeration takes place. This procedure is commonly known as "plating" of the powder. A major disadvantage of this method is that the oil droplets containing the aroma and flavour components attach themselves to the surface of each particle. Therefore the mentioned components are not well protected, neither against evaporation nor against chemical reactions such as oxidation. The oil itself is not well protected either and rancidity may develop. To guarantee an acceptable shelf life special methods have to be employed to pack these powders, such as packing in an atmosphere of inert gas. This last measure of course does not help in avoiding deterioration of the quality setting in after opening of the pack.

In this production of instant coffee powder it has also been proposed to combine the incorporation of the aroma and flavour components with a partial agglomeration (U.S. Pat. No. 3,077,405). In this case the aroma and flavour components are incorporated in an oil and the oil is sprayed on to the powder in such quantities that at the most 10% of the powder is agglomerated. However, it has been shown that the aroma and flavour components and the oil which are incorporated in the powder in this way, are not well protected. Packing in an inert atmosphere is desirable or even compulsory in this case too.

An object of the invention is to obtain a better protection of the aroma and flavour components in the instant powder.

The invention comprises an agglomerated instant powder in which aroma and flavour enriched droplets of a water-immiscible, preferably edible and organoleptically acceptable liquid are embedded in the bridges connecting the primary particles out of which the agglomerated granules are composed.

In a process to obtain this product according to the invention the following prerequisites are combined. First the aroma and flavour components have to be solved in a liquid from which they can not easily be volatilized, such as an oil, preferably an edible and organoleptically acceptable one. Secondly the incorporation in the instant powder takes place during an agglomeration process. Thirdly the agglomeration is executed by fusing together the particles originally obtained in the drying process, to porous agglomerates. Merely sticking the particles together as described by the process according to U.S. Pat. No. 3,077,405 doesn't serve the purpose.

The fusing together of the original particles just mentioned can be accomplished in several ways. The application of heat and steam is possible, but preferably water of comparatively low temperature is used. In this latter embodiment of the invention a fine mist of water and aroma and flavour bearing oil is applied to the powder, after which the powder is dried, preferably again at comparatively low temperatures.

Conveniently the fine mist of oil and water is obtained by first emulsifying the oil in water, after which this emulsion is transferred in fine droplets e.g. by spraying through a nozzle.

As a result of the process according to this invention the aroma and flavour bearing oil droplets are substantially completely embedded in the agglomerates, and are thus well protected. When applying this process it may even be possible to dispense with the precaution of packing the powder in an inert atmosphere. The process should preferably be executed in such a way that all or at least the greater part of the original particles are agglomerated. In this way an even distribution of the aroma and flavour principles in the product is obtained.

The agglomeration can very well be carried out in a device which brings about a rolling movement of the particles, such as a rotating drum or a vibrating table. With coffee powder particularly good results have been obtained with a rotating pan apparatus such as described in the British Pat. No. 1,248,310.

The quantities of water and oil used, the ratio of these quantities and the temperatures applied during the process of agglomeration have to be adjusted to each other, to the properties of the particular substance to be agglomerated and to the aroma and flavour components to be incorporated in the product.

The process according to the invention is especially useful for the production of instant coffee powder or an instant powder containing an appreciable quantity of soluble dried coffee extract. The following details are of interest in this particular case.

In the production of instant coffee it is customary to extract the roasted and ground coffee beans with water after which the water is removed e.g. by spray-drying or freeze-drying. In order to obtain a high yield it is necessary to contact the roasted and ground coffee with water of a high temperature for a prolonged period of time.

This treatment is detrimental to some important aroma and flavour components, which, being of a delicate nature, may undergo all kinds of chemical rearrangements or reactions.

For this reason it is customary to remove the aroma and flavour components from the coffee before the extraction, to recover them and to add them in one of the steps in the process for producing the instant coffee following the extraction step.

A common method to remove the volatile aroma and flavour components is to subject the roasted and ground coffee to a steamdistillation. The desired components are recovered in the steamdistillate. For convenience sake, only that part of the coffee mix is treated in this way which possesses the highest content of desirable aroma and flavour components.

Another method which has been proposed is to extract the roasted and ground coffee beans with a solvent, such as fluor containing compounds or liquid carbon dioxide.

The aroma and flavour compounds can be reintegrated with the main mass of the product by solving them in an edible and organoleptically acceptable oil which in its turn is incorporated in the product. Coffee-